Jan. 7, 1941.   L. A. TROFIMOV   2,227,801
POWER TRANSMISSION UNIT
Filed Oct. 10, 1938   2 Sheets-Sheet 2

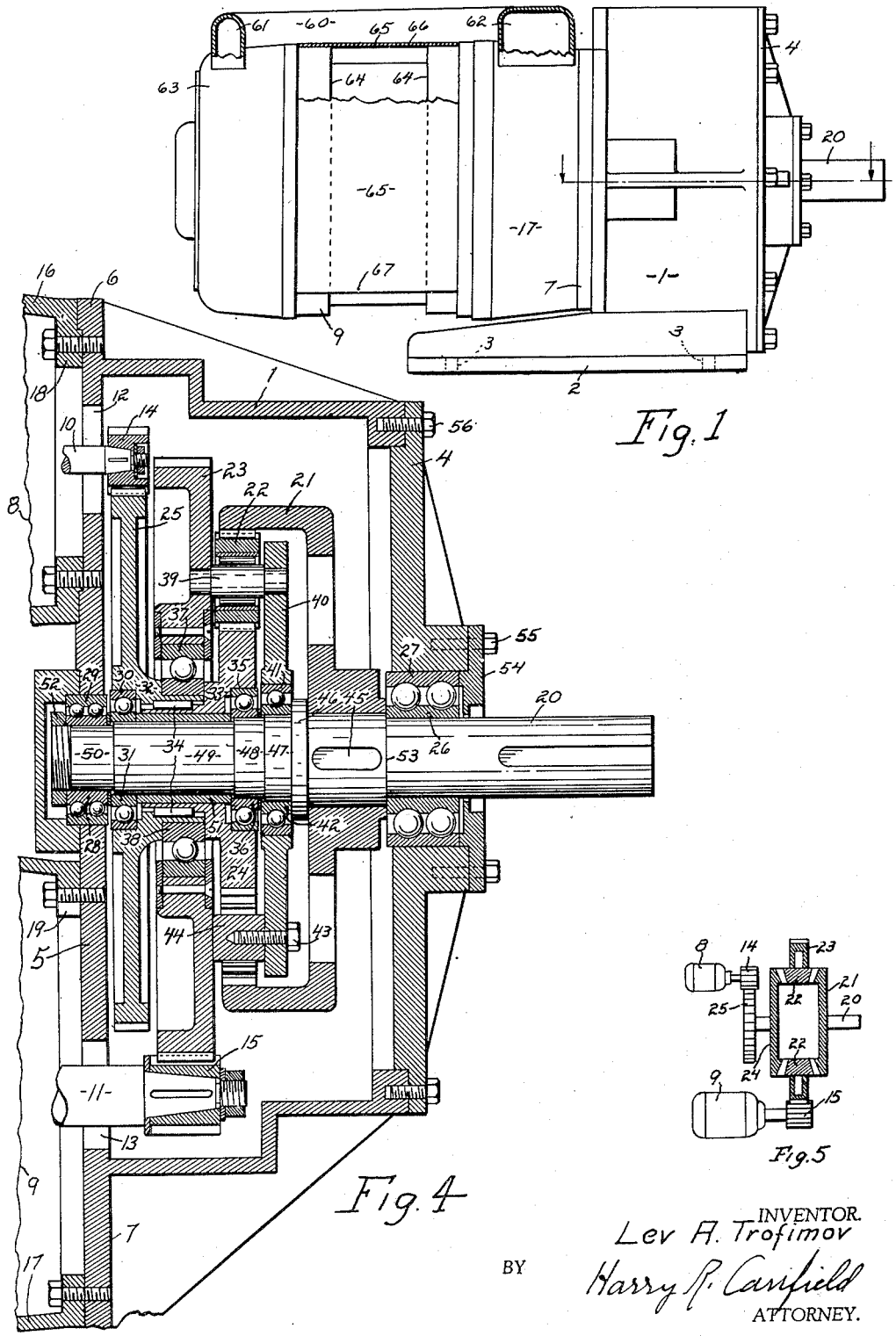

INVENTOR.
Lev A. Trofimov
BY Harry R. Canfield
ATTORNEY.

UNITED STATES PATENT OFFICE 2,227,801

POWER TRANSMISSION UNIT

Lev A. Trofimov, Cleveland, Ohio

Application October 10, 1938, Serial No. 234,144

4 Claims. (Cl. 74—282)

This invention relates to power transmission units and relates more particularly to power transmission units of the type in which electric motor power is transmitted at variable speed to a power delivery shaft through differential gearing.

Among the objects of the invention are:

To provide generally an improved power transmission unit;

To provide generally an improved variable speed power transmission unit;

To provide an improved construction of power transmission differential gearing;

To provide an improved power unit of the type comprising a three-element differential gearing and two motors for driving two of the elements of the gearing, to cause power to be delivered from the third element of the gearing;

To provide an improved power transmission unit by which electric motor power may be transmitted at variable speed, from zero speed to a maximum speed in either a forward or a reverse direction;

To provide improved means for cooling a motor or the motors of a power unit of the type comprising a three-element differential gearing, to two elements of which motors are drivingly connected and to the third element of which a power delivery shaft is connected.

Other objects will be apparent to those skilled in the art to which my invention appertains.

My invention is fully disclosed in the following description taken in connection with the accompanying drawings in which:

Figs. 1, 2 and 3 are respectively side elevational, end elevational, and top plan views of a preferred embodiment of my invention;

Fig. 4 is a sectional view to enlarged scale illustrating a part of a housing shown in Figs. 1 and 3, and a differential gearing therein, the view being taken approximately from the plane 4—4 of Fig. 1;

Fig. 5 is a diagrammatic view illustrating two motors, a differential gearing and a power delivery shaft and illustrating certain principles of the power transmission of the other figures of the drawings.

Figure 3:
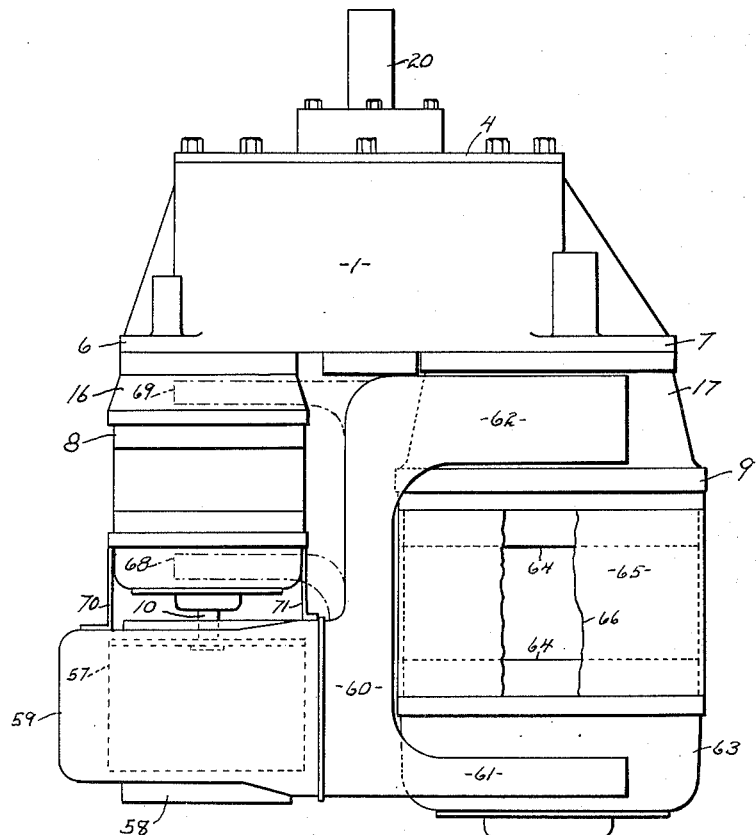

The power transmission unit embodying my invention comprises in general a three-element differential gearing, a constant speed electric motor drivingly connected to one of the elements of the gearing, a variable speed motor connected to another of the elements of the gearing, a power delivery shaft connected to the third element of the gearing. Means may also be provided, as hereinafter set forth, by which the constant speed motor effects air-cooling of the variable speed motor and, in some cases, effects cooling of itself. The parts are all arranged compactly and mounted in a novel arrangement upon a supporting base as a complete power unit.

Some of the elements of such a unit are illustrated diagrammatically in my Patent No. 2,133,365, issued October 18, 1938, for improvements in Hoist and drive control, wherein is set forth and claimed an electric control system in which power is transmitted to the drum of a hoist at variable speed and in hoisting or lowering direction; and the operation of a hoist as described in that patent may be considered as a practical use of the unit of the instant application.

Referring to the drawings, I have shown generally at 1, a main frame in the form of a housing having integral therewith within the lower part thereof, horizontally extending, substantially parallel supports 2—2 preferably of angle cross section and having perforations 3—3 for securing them and the housing to a floor or other support.

The housing is generally in the form of a hollow horizontal cylinder, the forward end of which is closed by a cover plate 4. The rearward end of the housing is also generally closed by an integral web 5, as shown in Fig. 4, the web continuing into outwardly laterally extending wings 6 and 7. Upon the web 5 and wing 6 is mounted a motor 8; and upon the web 5 and wing 7 is mounted a motor 9, the shafts 10 and 11 of the motors being disposed substantially parallel to each other and projecting through openings 12 and 13 in the web 5 and having rigidly secured thereto respectively pinions 14 and 15. To thus support the motors and align their shafts, the motors have their end bells 16 and 17 provided with flanges 18 and 19 by which the end bells may be secured by bolts to the web 5 and the wings 6 and 7.

A differential gearing mechanism within the housing 1 will now be described. This differential gearing is shown diagrammatically in Fig. 5, wherein is illustrated a power delivery shaft 20 connected to a side gear 21, meshed with pinions 22—22 rotatably mounted on a spider gear 23, the teeth of which are meshed with the pinion 15 of the motor 9, the other side gear 24 being connected to a gear 25 meshed with the pinion 14 of the motor 8. Referring to Fig. 4, the power delivery shaft 20, is rotatably supported in axially spaced bearings in the cover plate 4 and web 5, the bearing in the cover plate comprising an inner raceway 26 on the shaft and an outer raceway 27 in the end plate with balls therebetween; and the bearing in the web 5 comprising an inner raceway 28 on the shaft and an outer raceway 29 in the web with balls therebetween.

The pinion 14 is meshed with a gear 25 coaxial with the shaft 20 and rotating on a ball bearing comprising an outer raceway 30 in the central part, or hub, 32 of the gear and an inner raceway 31 on the shaft, and balls therebetween.

The hub 32 of the gear 25 is telescoped over a hub 33 of a gear 24, the two hubs being connected together by a key or keys 34 to cause one to rotate with the other.

The gear 24 rotates on a bearing comprising an outer raceway 35 in the central portion of the gear and an inner raceway 36 on the shaft 20 with balls therebetween.

A spider 23 rotates on a ball bearing comprising an outer raceway 37 in the central portion of the gear 23 and an inner raceway 38 on the hub 32 of the gear 25.

A plurality, such as three, of pinions 22, one of which is shown, rotate on roller bearings upon pins 39, one of which is shown for the pinion 22 illustrated, the pin 39 at one end being secured to the gear 23 and at the other end being secured to a support 40, which rotates on a ball bearing comprising an outer raceway 41 in the support and an inner raceway 42 on the shaft 20. Between adjacent pins 39—39, the support 40 is secured to the gear 23 by screws 43 screwed into bosses 44 on the gear.

External teeth on the gear 24 mesh with teeth on the pinions 22.

An internal gear 21 has teeth meshing with the pinions 22 outwardly of the gear 24 and the gear 21 is secured to the shaft 20 by a key, not shown, in a keyway 45.

The shaft has a collar 46 integral therewith and shaft portions 47, 48, 49 and 50 of consecutively smaller diameter; and the inner raceway 42 is pressed against the collar 46, the inner raceway 36 is pressed against the inner raceway 42, the inner raceway 31 is pressed against the inner raceway 36 through the agency of a sleeve 51, and the inner raceway 28 is pressed against the inner raceway 31, and all of the parts thus referred to are rigidly pressed against each other and against the collar 46 by a screw 52 on the end of the shaft 20.

A shoulder 53 on the shaft engages the inner raceway 26 and a plate 54 secured by screws 55 upon the cover plate 4 engages the outer raceway 27. The cover plate 4 is detachably mounted on the end of the housing 1 by screws 56.

By means of the construction above described the elements of the differential gearing are all arranged to rotate co-axially; and are disposed compactly in the minimum of space, nesting one within the other, and the parts are rendered accessible by removal of the cover plate 4, and the parts are assembled as a unit in the housing 1.

In the practice of my invention, the motor 8 may be a lower powered motor than the motor 9 and is so illustrated, contemplating the use for the unit set forth in the above identified patent, and when used as described in that patent, the motor 8 runs continuously at a constant speed and the motor 9 at variable speed controlled by an electric controller. At an intermediate speed of the motor 9, the power delivery shaft 20 remains at rest. Upon increasing the speed of the motor 9 the power delivery shaft 20 rotates in one direction commensurable with the increase of motor speed, and upon rotating the motor 9 at a speed less than the said intermediate speed, the power delivery shaft 20 rotates in the other direction at a velocity commensurable with the decrease of motor speed.

The foregoing relations are illustrated in Fig. 5. Although this figure is not intended to illustrate actual gear ratios, I prefer to have the gear ratios such that when the motor 9 revolves at one-half the speed of the motor 8, the shaft 20 will remain at rest, although this is not essential.

Figure 2:
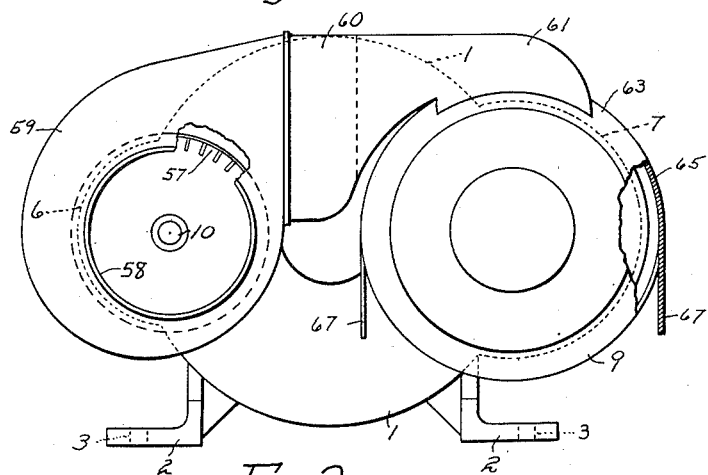

In some cases, the motor 9 may be rotated at such speed that with an economical commercial design it may tend to overheat, and in such cases, I may employ a cooling system therefor, the preferred form of which is illustrated and will now be described, referring to Figs. 1, 2 and 3.

The shaft 10 of the motor 8 is extended rearwardly and has connected thereto or mounted thereon the rotor 57 of a centrifugal fan, to which air is admitted through the usual large diameter inlet passageway 58. The rotor 57 is surrounded by the usual air housing 59 and has an air outlet duct 60 divided into two branches 61 and 62, which communicate with and open downwardly into the end bells 63 and 17 of the motor 9. I prefer to employ a motor 9 of the well known construction illustrated, having ventilating openings at 64—64 and the air conducted under pressure from the branches 61 and 62 into the motor through its end bells, may exhaust outwardly to atmosphere through the openings at 64—64 thus force-ventilating the motor. In some cases, however, I prefer to direct the blast of ventilating air thus provided downwardly, and to this end, a sheet metal cover 65 is provided bent into U-form, the closed end of the U embracing the upper side of the motor 9, as at 66, radially outwardly of the openings 64—64 and the sides of the U-form extending downwardly as at 67—67. By this means the ventilating air exhausting outwardly through the openings at 64—64 is caused to flow downwardly around the motor and out under the parts 67—67 of the cover.

In like manner, the motor 8 may be ventilated and to this end, duct branches 68 and 69 are indicated in broken line, although the motor 8 running at constant speed ordinarily will not have to be ventilated by other means than that which is usually provided therefor.

Any means may be provided to support the housing 59 of the fan and the duct 60 and branches 61 and 62. The ends of the branches 61 and 62 may be supported at their point of juncture with the end bells of the motor 9 illustrated, and the housing 59 may be supported as illustrated by brackets 70 and 71 mounted on the adjacent end bell of the motor 8 and connected to the housing.

My invention is not limited to the exact details of construction illustrated and described. Changes and modifications may be made within the spirit of my invention without sacrificing its advantages and within the scope of the appended claims.

I claim:

1. In a variable speed power transmission unit, a main frame, two motors supported on the frame with their shafts substantially parallel, one motor being a constant speed motor and the other motor being a variable speed power supplying motor, a power delivery shaft rotatably supported on the frame, a motor pinion on the shaft of each motor, differential gearing meshed with the said pinions and connected to the power delivery shaft, a blower having air delivery ducts communicating with the interior of the variable speed motor and the blower comprising a rotor of the type having a predetermined maximum efficiency speed and driven at a constant speed by the other motor.

2. In a power transmitting unit, a main frame, two motors supported on the frame, a motor pinion on the shaft of each motor, a power delivery shaft rotatably supported on the frame, a pair of co-axial gears spaced apart axially, a rotational bearing for each gear on the power delivery shaft, the said gears being connected together, a differential spider gear element disposed axially between the co-axial gears and having a rotational bearing on one of them, one of said motor pinions being meshed with one of said co-axial gears and the other motor pinion being meshed with the spider gear element, a plurality of differential pinions rotatably carried by the spider gear element and meshed with the other co-axial gear, and an internal gear connected to the power delivery shaft and meshed with the differential pinions.

3. In a power transmitting unit, a main frame, two motors supported on the frame, a motor pinion on the shaft of each motor, a power delivery shaft rotatably supported on the main frame, a pair of co-axial gears spaced apart axially, a rotational bearing for each gear on the power delivery shaft, the said gears having hubs surrounding the power delivery shaft and connected together, a differential spider gear element disposed between the co-axial gears and having a rotational bearing on the connected hubs, one of said motor pinions being meshed with one of said co-axial gears, the other motor being meshed with the spider gear element, a plurality of differential pinions rotatably carried by the spider gear element and meshed with the other co-axial gear and an internal gear connected to the power delivery shaft and meshed with the differential pinions.

4. In a power delivery transmission unit, a main frame, two motors supported on the frame, a motor pinion on the shaft of each motor, a power delivery shaft rotatably supported on the main frame, a pair of co-axial gears spaced apart axially, a rotational bearing for each gear on the power delivery shaft, the said gears being connected together, a differential spider gear element disposed axially between the co-axial gears and having a rotational bearing on one of them, one of said motor pinions being meshed with one of said co-axial gears and the other motor pinion being meshed with the spider gear element, a supplemental spider element rotatably supported on the power delivery shaft, a plurality of differential pinions rotatably carried jointly by the spider gear element and supplemental spider element and meshed with the other co-axial gear, and an internal gear connected with the power delivery shaft and having a portion co-axial of and radially outward of the supplemental spider element and meshed with the differential pinions.

LEV A. TROFIMOV.